UNITED STATES PATENT OFFICE.

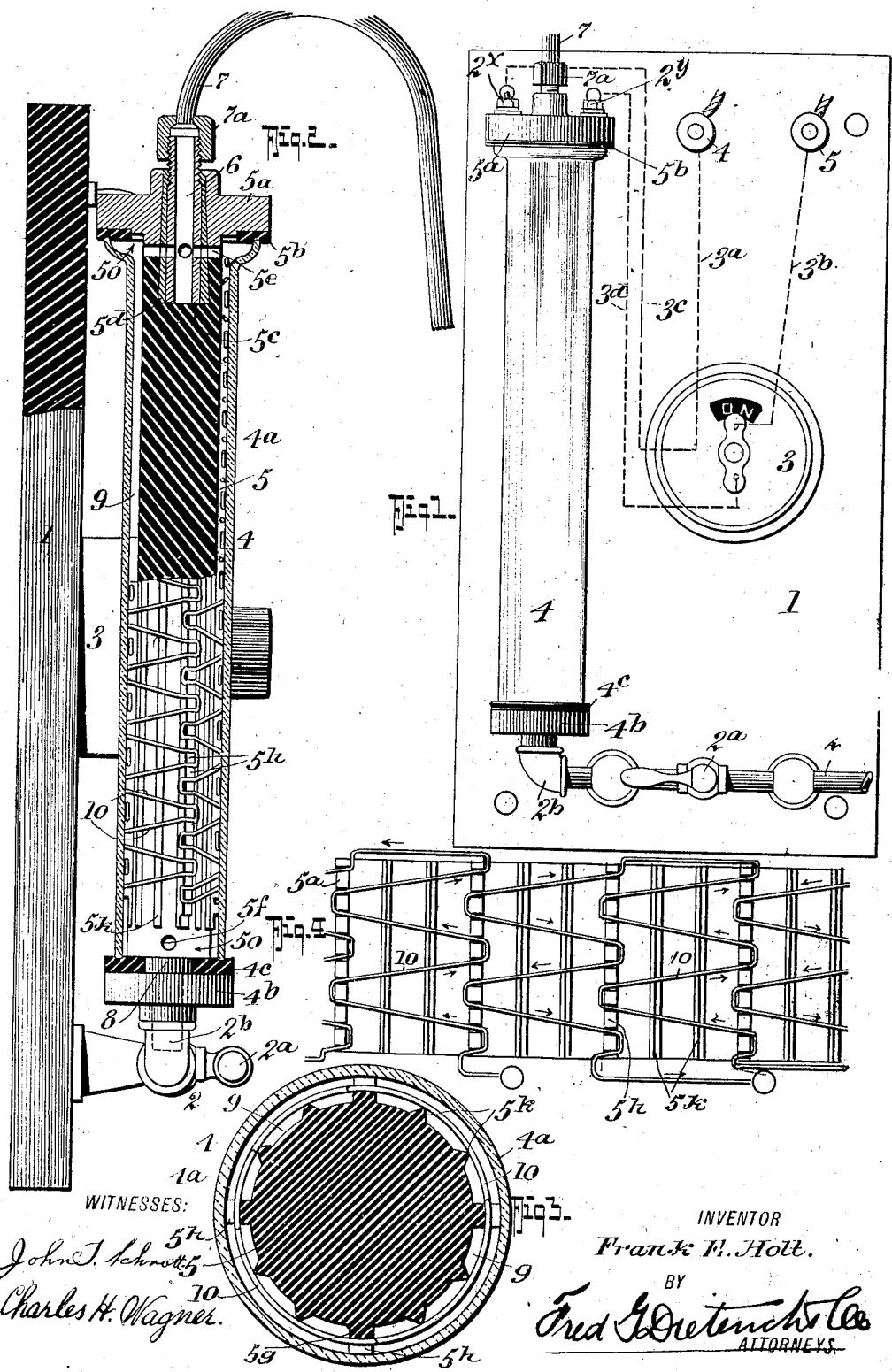

FRANK E. HOLT, OF VANCOUVER, BRITISH COLUMBIA, CANADA.

ELECTRIC WATER-HEATER.

No. 894,323.

Specification of Letters Patent.

Patented July 28, 1908.

Application filed April 2, 1908. Serial No. 424,680.

*To all whom it may concern:*

Be it known that I, FRANK E. HOLT, a citizen of the Dominion of Canada, and a resident of Vancouver, British Columbia, have invented certain new and useful Improvements in Electric Water-Heaters, of which the following is a specification.

My invention relates to certain new and useful improvements in instantaneous electric water heaters in which means are provided for heating a running current of water and maintaining the water in direct contact with the heating element so as to utilize all of the heat energy.

Again my invention has for its object to provide an improved construction of core and manner of winding the heating element on said core to hold the same in place without using fastening devices.

More specifically my invention embodies a heater having a casing in which a core is placed, the core having a series of radial members making contact with the casing, and dividing the same into a series of peripherally arranged water passages, the heating element being wound in a zig-zag manner between said projecting members of the core. The core is also provided with intermediate V-shaped ribs over which the heating element is passed so that the heating element only contacts with a minimum core surface so as to permit the water being acted upon by the heating element throughout its entire length, the V-shaped ribs extending only approximately one-half of the distance between the core proper and the casing so as to permit the water to flow on both sides of the heating element, or in other words, so as to locate the heating element about in the mid-position of the water passages.

My invention also includes those novel details of construction, arrangement and combination of parts, all of which will be first described, and then be specifically pointed out in the appended claims, reference being had to the accompanying drawings, in which:—

Figure 1, is a face view of my invention, the electric circuit being shown in dotted lines. Fig. 2, is a central, vertical longitudinal section thereof a part of the core being shown in elevation. Fig. 3, is an enlarged transverse section on the line 3—3 of Fig. 1, showing the water passages and the position of the heating element in such passage. Fig. 4, is a detail development of a portion of the core surface, showing the manner of stringing the wires or heating element thereon.

Referring now to the accompanying drawings in which like letters and numbers of reference indicate like parts in all of the figures, 1 designates an insulating base upon which the water inlet pipe 2, the switch 3 and the heater 4 are mounted.

The water inlet pipe 2 carries a stop cock $2^a$, whereby the water may be controlled to flow to the heater, and the electric switch 3, which may be of any approved construction is connected by leads $3^a$—$3^b$ with the contact terminals 4 and 5 to which the source of electric energy is connected. Leads $3^c$ and $3^d$ connect the switch 3 with the terminals $2^x$ and $2^y$ of the heater 4.

The heater 4 comprises a casing $4^a$ which may be of glass or any other insulating, or other suitable material, the casing $4^a$ being open at its ends and closed by washers $4^c$ and $5^b$ respectively which are held between the casing end and the heads $5^a$ and $4^b$ respectively, which will be hereinafter again referred to.

The core 5 which fits within the casing $4^a$ is of a peculiar construction and forms one of the essential features of my invention. A reference to Figs. 2 and 3, will disclose the fact that the core 5 is provided with a series of radial projections forming partitions and extending from the core to the walls of the casing $4^a$, so as to divide the space between the core proper and the casing $4^a$ into a series of water passages 9, which extend from one end of the casing to the other.

The partitions $5^g$, which divide the casing into the compartments 9, do not extend entirely to the ends of the core 5, but leave spaces 50 at the end thereof to form water chambers from which the water flows through the passages 9 from end to end of the casing, in a manner which will be hereinafter more fully explained.

The core 5 is integrally formed or fastened, in any approved manner to the head $5^a$, which, together with the washers $5^b$ serve to form a closure for the upper end of the casing $4^a$, and the head $5^a$ and core 5 are bored to form a chamber or socket $5^c$ to receive the pipe 6 which is held in place by cement $5^d$ or any other approved means and which is connected with the outlet spout 7 through a union $7^a$ as clearly indicated in Fig. 2 of the drawings.

At the upper end the core 5 is bored with a series of apertures $5^e$ so that communication may be had with the upper chamber 50 from the pipe 6 so that the water from the chamber 50 passing through the bores $5^e$ will flow into the pipe 6 and then pass out through the spout 7. A pipe 8 is similarly fastened to the core 5 at the lower end and is connected with the union $2^b$ of the pipe 2 and the water passing through the pipe 2 passes through passages $5^f$ that pass through the core 5 and pipe 8, and into the lower chamber 50, from whence it flows through the passages 9 to the upper chamber 50 and out through pipe 6 and spout 7 in a manner which will be presently more fully explained. The core 5 is also provided with a series of parallelly arranged longitudinal ribs $5^k$ of V-shape in cross section and spaced apart, the ribs $5^k$ having their edges projected about one-half the distance between the core proper and the casing $4^a$, as indicated in Fig. 3, so as to form, as it were, knife edges upon which the heating element 10 rests. This leaves a water space between the heating element 10 and the core, and between the heating element 10 and the casing, so that the heating element, as it were, is practically in the middle of the water passage so that the water can engage the heating element practically on all sides.

The partition ribs $5^g$ are provided with a series of spaced transverse grooves forming, as it were, a series of lugs $5^h$, around which the heating element 10 is passed and wound zig-zag, as indicated in Figs. 2 and 4 of the drawings. This makes a very effective winding of the heating element on the core and enables a large amount of heating element to be wound on the core and by virtue of the lugs $5^h$, formed in the ribs by the transverse grooves, the heating element can be wound around such lugs $5^h$ to pass across the V-shaped ribs, and by virtue of such ribs being of V-shape in cross section the amount of contact between the ribs and the heating element is very slight, allowing the water to contact the heating element throughout as much of its surface as is possible. Furthermore, by constructing the core and heating element as described, the water will be more quickly heated as it is not necessary for the core to be heated by the heating element, for the reason that the water passing on both sides of the heating element will have the full benefit of all the heat of the heating element and hence make it unnecessary to first heat the core 5, as is the case in that type of heaters wherein the water passing through a core, through a porcelain tube or through passages of a core in which the wire is wound tightly against the core, only a small surface, if any, of the wire is exposed to contact with the water that is to be heated.

It should be understood that the core 5 may be constructed of any suitable material, in practice, but preferably constructed of porcelain, lava, or the like, so as to be practically fire-proof.

So far as described, the manner in which my invention operates will be best explained as follows: The operator desiring to obtain instantaneous hot water, turns on the switch 3 and the cock $2^a$ and permits the water to flow through the heater. As the electric current passes through the heating element 10, the same will be rendered hot and may be if desired brought up to incandescence, so that when the water passes through the passages 9, from end to end of the casing, and in contact with the heating element the heat thereof will be imparted to the water instantaneously and as the water passes out of the pipe 7 it will be hot. The temperature of the water may be regulated by regulating the current flowing through the heating element in a manner well understood by those skilled in the art.

From the foregoing description taken in connection with the accompanying drawings, it is thought the complete construction, operation and many advantages of my invention will be readily understood by those skilled in the art to which the invention appertains, and I desire to say that numerous slight changes in the details of construction, combination and arrangement of parts may be made without departing from the spirit of the invention or the scope of the appended claims.

What I claim is:

1. An electric water heater comprising a casing, a core disposed therein and having a series of peripherally arranged partitions dividing the casing into a series of water passages, a heating element wound on said partitions across said water passages, substantially as shown and described.

2. An electric water heater comprising a casing, a core disposed therein and having a series of peripherally arranged partitions dividing the casing into a series of water passages, a heating element wound on said partitions across said water passages, and a series of parallelly disposed ribs carried by the core in said water passages over which said heating element passes.

3. An electric water heater comprising a casing, a core disposed therein, said core having a series of peripherally arranged lontudinal partitions dividing the casing into a series of water passages from end to end, said core having a series of parallelly disposed V-shaped ribs in said water passages, a heating element held over said partitions in said water passage, and against said ribs, substantially as shown and described.

4. An electrical water heater comprising a casing, end closure members therefor, a core disposed in said casing from end to end, said core having a series of spaced partitions forming water passages between them, said partitions having transverse grooves to form lugs, a heating element wound zig-zag on said core around said lugs and across said water passages, substantially as shown and described.

5. An electrical water heater comprising a casing, end closure members therefor, a core disposed in said casing from end to end, said core having a series of spaced partitions forming water passages between them, said partitions having transverse grooves to form lugs, a heating element wound zig-zag around said lugs and across said water passages, and said core having a supplemental series of ribs projecting into said water passages over which said heating element passes.

6. An electric water heater comprising a casing, a core mounted within said casing and having an integrally formed head to form a closure for one end of said casing, means for closing the other end of said casing, means for leading water into one end of said casing and means for drawing it off from the other end of said casing, said core having a series of longitudinal peripheral water passages running from end to end and parallel with the longitudinal axis of said core, and said core also having a series of ribs running parallel in said water passages and a heating element wound on said core.

7. In an electric water heater, a core having a series of peripherally spaced longitudinal partitions on its outer surface, and a series of intermediate ribs on its outer surface projecting a lesser distance than the partitions.

8. In an electric water heater, a core having a series of peripherally spaced longitudinal partitions on its outer surface and a series of intermediate ribs on its outer surface projecting a lesser distance than the partitions, a casing in which said core is mounted, means for leading water into one end of said casing, and means for withdrawing water from the other end of said casing, and a heating element wound on said core within said casing to be in contact with the water as it passes through the water passage.

9. In an electric water heater, a core having a series of peripherally spaced longitudinal partitions on its outer surface, and a series of intermediate ribs on its outer surface projecting a lesser distance than the partitions, a casing in which said core is mounted, means for leading water into one end of said casing, and means for withdrawing water from the other end of said casing, a heating element wound on said core within said casing to be in contact with the water as it passes through the water passages, said core having means for sustaining said heating element in a zig-zag position.

FRANK E. HOLT.

Witnesses:
ALBERT E. DIETERICH,
GEO. B. PITTS.